US009607232B2

(12) United States Patent
Peyronneaud et al.

(10) Patent No.: US 9,607,232 B2
(45) Date of Patent: Mar. 28, 2017

(54) DECISION DEVICE PROVIDED TO DECIDE WHETHER AN EYE IS REAL OR FALSE

(71) Applicant: MORPHO, Issy les Moulineaux (FR)

(72) Inventors: Benjamin Peyronneaud, Issy les Moulineaux (FR); Charlotte Cottez, Issy les Moulineaux (FR); Florence Guillemot, Issy les Moulineaux (FR); Marcelin Ragot, Issy les Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 0 days.

(21) Appl. No.: 14/908,288

(22) PCT Filed: Aug. 12, 2014

(86) PCT No.: PCT/FR2014/052084
§ 371 (c)(1),
(2) Date: Jan. 28, 2016

(87) PCT Pub. No.: WO2015/025103
PCT Pub. Date: Feb. 26, 2015

(65) Prior Publication Data
US 2016/0162744 A1 Jun. 9, 2016

(30) Foreign Application Priority Data
Aug. 23, 2013 (FR) .................................. 13 58150

(51) Int. Cl.
*G06K 9/00* (2006.01)
*G06K 9/46* (2006.01)
(Continued)

(52) U.S. Cl.
CPC ..... *G06K 9/00899* (2013.01); *G06K 9/00268* (2013.01); *G06K 9/00604* (2013.01);
(Continued)

(58) Field of Classification Search
USPC .......................................................... 348/76
See application file for complete search history.

(56) References Cited

U.S. PATENT DOCUMENTS

| 2007/0258630 | A1* | 11/2007 | Tobin | G06K 9/0061 |
| | | | | 382/128 |
| 2008/0253622 | A1 | 10/2008 | Tosa et al. | |
| 2014/0226876 | A1* | 8/2014 | Savvides | G06K 9/00604 |
| | | | | 382/117 |

OTHER PUBLICATIONS

Mar. 13, 2015 Search Report issued in International Patent Application No. PCT/FR2014/052084.
(Continued)

*Primary Examiner* — Gims Philippe
*Assistant Examiner* — Joseph Becker
(74) *Attorney, Agent, or Firm* — Oliff PLC; R. Brian Drozd

(57) ABSTRACT

A decision device for deciding whether an eye having a macula and an optical axis is real or false includes: lighting means emitting an infrared flux towards the eye along an entry axis; an infrared capture means for capturing an image of the eye along an exit axis, the entry and exit axes being aligned with the optical axis so that the macula illuminated by the lighting means under the incidence of the entry axis is seen by the capture means; processing means for detecting, on an image captured by the capture means, whether a peripheral zone representing the iris exists and whether a central zone in the peripheral zone, the color of which is representative of the macula existence, exists, and for delivering information representing this detection; and decision means for deciding whether the eye is real or false according to the information delivered by the processing means.

2 Claims, 2 Drawing Sheets

Figure 1:
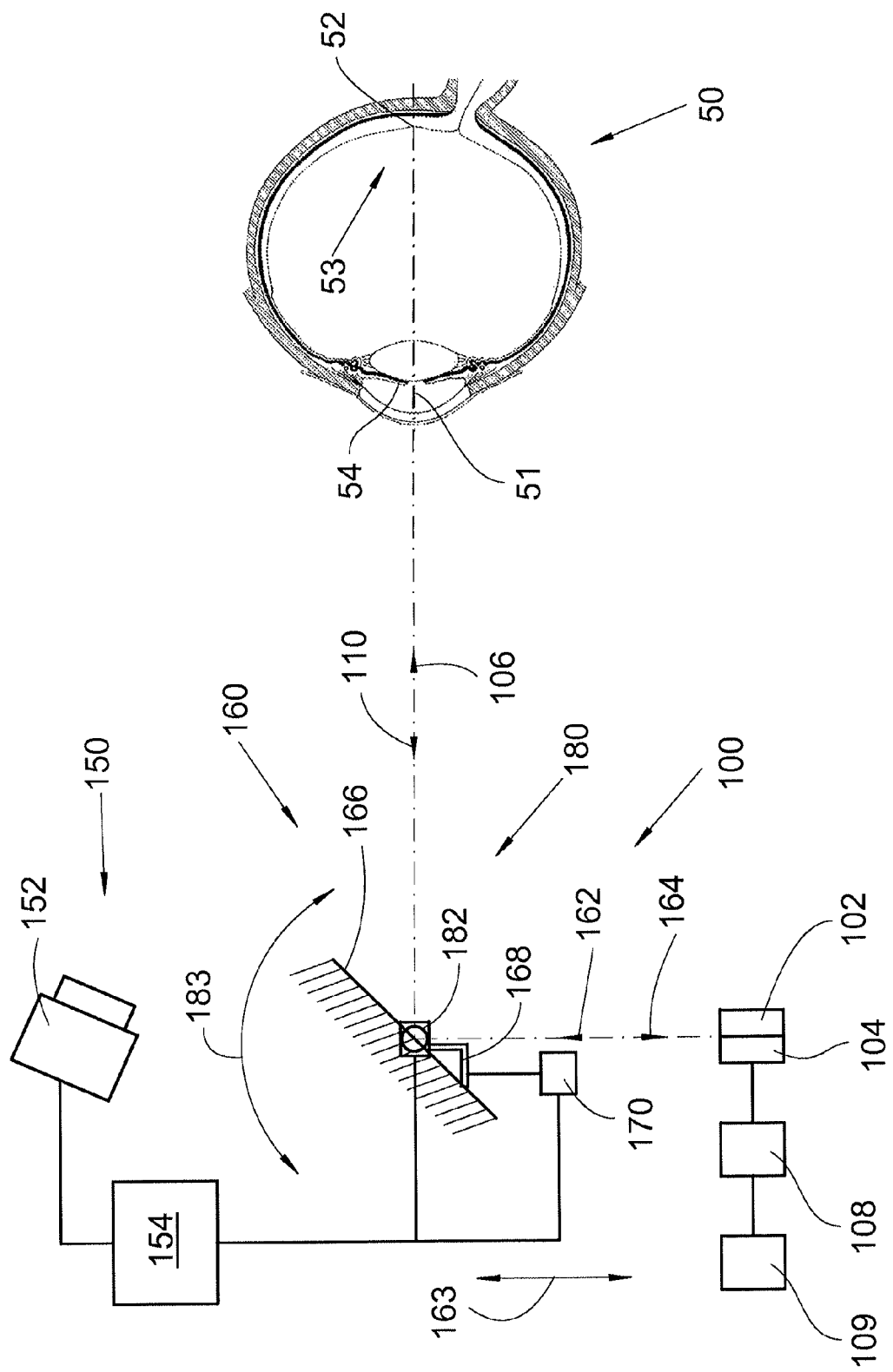

(51) Int. Cl.
    *G06K 9/52*     (2006.01)
    *G06T 7/00*     (2017.01)
    *G06T 7/40*     (2017.01)
    *G06T 7/60*     (2017.01)
    *H04N 5/225*     (2006.01)

(52) U.S. Cl.
    CPC ....... *G06K 9/00617* (2013.01); *G06K 9/4652* (2013.01); *G06K 9/52* (2013.01); *G06T 7/0028* (2013.01); *G06T 7/0042* (2013.01); *G06T 7/408* (2013.01); *G06T 7/60* (2013.01); *H04N 5/2256* (2013.01); *G06K 2009/4666* (2013.01)

(56) References Cited

OTHER PUBLICATIONS

Toth; "Liveliness Detection: Iris;" Encyclopedia of Biometrics; Jan. 1, 2009; vol. 2; pp. 931-938.

Rakvic et al; "Iris Acquisition Device;" Encyclopedia of Biometrics; Jan. 1, 2009; vol. 2; pp. 761-769.

Usher et al; "Simultaneous Capture of Iris and Retina for Recognition;" Encyclopedia of Biometrics; Jan. 1, 2009; vol. 2; pp. 1212-1217.

Usher et al; "Occular Biometrics: Simultaneous Capture and Analysis of the Retina and Iris;" Advances in Biometrics; Jan. 1, 2007; pp. 133-155.

\* cited by examiner

DECISION DEVICE PROVIDED TO DECIDE WHETHER AN EYE IS REAL OR FALSE

The present invention relates to a decision device provided to decide whether an eye is real or false, and a decision method used by such a decision device.

It finds an application in the field of biometric recognition and in particular in the field of identification by recognition of the eyes.

Recognition of the iris of an eye is used to protect installations such as for example building or machines. This technology makes it possible to dispense with access codes or cards, which may be stolen or falsified. The use of this technology reinforces security since the probability that two persons have two identical irises is almost nil.

Recognition of the iris may be based on the comparison of the image of the iris of the user with a set of reference iris images stored in a database or on the comparison of a code relating to the iris with a set of codes stored in a database. The codes are generated by an algorithm from the image of the iris and contain a set of information characteristic of the image of the iris. As with the iris images these codes are unique for each individual. These codes may be considered to be models representing the corresponding irises.

Although pirating iris recognition devices is difficult, it is not impossible.

This is because some pirates produce decoys, such as for example a photograph or an eye made from synthetic material on which the iris to be imitated is reproduced. The pirate can then place the decoy in front of the acquisition device of the iris recognition device, which is then deceived.

To overcome this type of pirating, several solutions have already been envisaged but all have certain weaknesses.

One object of the present invention is to propose a decision device for deciding whether an eye is real or false and which does not have the drawbacks of the prior art.

To this end, a decision device is proposed for deciding whether an eye having a macula and an optical axis is real or false, said decision device comprising:
  lighting means emitting an infrared flux towards the eye along an entry axis,
  an infrared capture means provided for capturing an image of the eye along an exit axis, the entry axis and the exit axis being aligned with the optical axis so that the macula illuminated by the lighting means under the incidence of the entry axis is seen by the capture means,
  processing means provided for detecting, on an image captured by the capture means, whether a peripheral zone representing the iris exists and whether a central zone in the peripheral zone, the colour of which is representative of the existence of the macula, exists, and for delivering information representing this detection, and
  decision means provided for deciding whether the eye is real or false according to the information delivered by the processing means.

Advantageously, the decision device further comprises tracking means provided for tracking a face of an individual passing in front of the lighting means and the capture means, in order to locate an eye on this face and to determine the direction of the optical axis of this eye, and positioning means controlled by the tracking means and provided for aligning the entry axis, the exit axis and the optical axis.

Advantageously, the decision device further comprises offsetting means controlled by the tracking means and provided for offsetting the entry axis and the exit axis with respect to the optical axis so that, even if the macula remains partly illuminated by the lighting means, it is no longer seen by the capture means.

Advantageously, the lighting means have an emission direction, the capture means has a reception direction, the emission direction and the reception direction are vertical, the optical axis is horizontal, the positioning means comprise firstly a base on which a 45° mirror is mounted, disposed vertically above the lighting means and the capture means, and secondly a linear movement means provided for linearly moving the base parallel to the emission direction, and the offsetting means comprise an angular movement means mounted on the base and carrying the mirror.

The invention also proposes a decision method provided for deciding whether an eye having a macula and an optical axis is real or false and used by a decision device comprising lighting means emitting an infrared flux on an entry axis, an infrared capture means provided for capturing an image on an exit axis, processing means, and decision means, said decision method comprising:
  an alignment step during which the entry axis and the exit axis are aligned with the optical axis so that illumination of the macula by the lighting means under the incidence of the entry axis is seen by the capture means,
  a lighting step during which the lighting means illuminate the eye,
  a capture step during which the capture means captures an image of the zone of the eye thus illuminated,
  a processing step during which the processing means detect, on an image thus captured, whether a peripheral zone representative of the iris exists and whether a central zone in the peripheral zone, the colour of which is representative of the existence of the macula, exists, and deliver information representing this detection, and
  a decision step during which the decision means decide whether the eye is real or false according to the information delivered by the processing means.

Advantageously, when the decision device comprises tracking means and positioning means controlled by the tracking means, the alignment step consists of a step of tracking the face, a step of locating an eye on this face thus tracked, a step of determining the direction of the optical axis of this eye, and a positioning step during which the positioning means align the entry axis and the exit axis with the optical axis.

The invention also proposes a decision method provided for deciding whether an eye having a macula and an optical axis is real or false and implemented by a decision device comprising lighting means emitting an infrared flux along an entry axis, an infrared capture means provided for capturing an image on an exit axis, processing means, tracking means, positioning means controlled by the tracking means, offsetting means controlled by the tracking means, and decision means, said decision method comprising:
  a tracking step during which the tracking means track a face of an individual passing in front of the lighting means and the capture means, locate an eye on this face and determine the direction of the optical axis of this eye,
  an alignment step during which the positioning means align the entry axis and the exit axis with the optical axis so that illumination of the macula by the lighting means under the incidence of the entry axis is seen by the capture means,
  a first lighting step during which the lighting means illuminate the eye.

a first capture step during which the capture means captures an image of the zone of the eye thus illuminated, a first processing step during which the processing means detect on the image thus captured whether a peripheral zone representative of the iris exists and whether a central zone in the peripheral zone, the colour of which is representative of the existence of the macula, exists, and deliver a first item of information representing this detection, a disalignment step during which the offsetting means offset the entry axis and the exit axis from the optical axis so that, even if the macula remains partly illuminated by the lighting means, it is no longer seen by the capture means, a second lighting step during which the lighting means illuminate the eye, a second capture step during which the capture means captures an image of the zone of the eye thus illuminated, a second processing step during which the processing means detect, on an image thus captured, whether a peripheral zone representative of the iris exists and whether a central zone in the peripheral zone, the colour of which is representative of the existence of the macula, exists, and deliver a second item of information representing this detection, and a decision step during which the decision means decide whether the eye is real or false according to the first item of information and second item of information delivered by the processing means.

Figure 2:
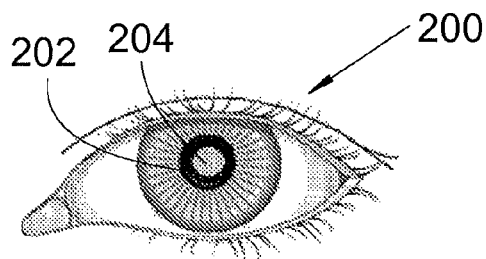
Figure 3:
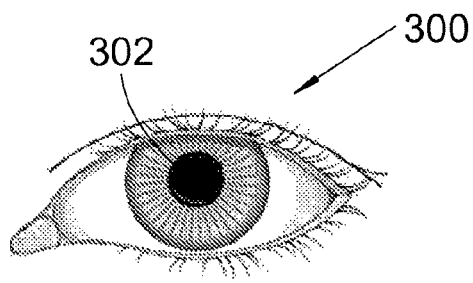
Figure 4:
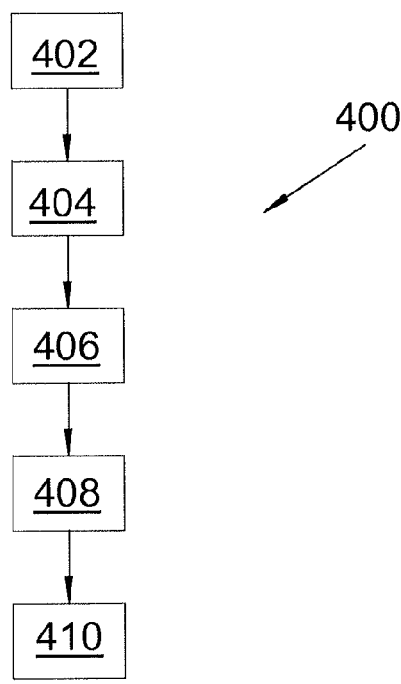
Figure 5:
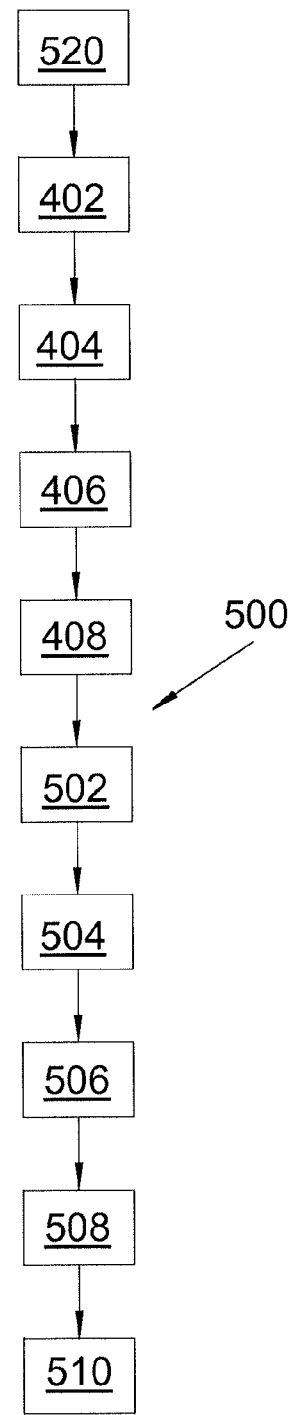

The features of the invention mentioned above, as well as others, will emerge more clearly from a reading of the following description of an example embodiment, said description being given in relation to the accompanying drawings, among which:

FIG. 1 depicts a schematic view of a decision device according to the invention, FIG. 2 shows an image of a real eye as seen by the decision device, FIG. 3 shows an image of a false eye as seen by the decision device, FIG. 4 is an algorithm of a decision method according to a first embodiment of the invention, and FIG. 5 is an algorithm of a decision method according to a second embodiment of the invention.

FIG. 1 shows a decision device 100 according to the invention that is oriented towards an eye 50. In the remainder of the description, a single eye 50 is presented and the decision device 100 is exposed to this eye 50 but the invention functions in the same way if there are two eyes 50 and one decision device 100 for each eye 50.

In the remainder of the description, the infrared flux are shown as having zero thickness, but these infrared beams must be understood as having a certain thickness.

A real eye 50 conventionally has an iris 54 and a fovea 52 that is the central zone of the macula 53 and an optical axis 51 that passes through the centre of the pupil and the fovea 52.

The decision device 100 is provided for deciding whether the eye is real or false.

The decision device 100 comprises lighting means 102 provided for illuminating the eye 50 with an infrared flux along an entry axis 106.

The decision device 100 comprises an infrared capture means 104 here taking the form of an infrared camera 104 that is here coupled to the lighting means 102.

The infrared capture means 104 is provided for capturing an image of the eye 50 on an exit axis 110.

The entry axis 106 and the exit axis 110 are aligned with the optical axis 51 so that the macula 53 illuminated by the lighting means 102 under the incidence of the entry axis 106 is seen by the capture means 104. The alignment of the optical axis 51, the entry axis 106 and the exit axis 110 therefore ensures that the capture means 104 views the illuminated macula 53.

Geometrically this alignment consists of positioning the entry axis 106 inside a cone, the vertex of which is the fovea 52, the axis of which is the optical axis 51 and the half-angle at the vertex of which is 5°. The exit axis 110 is also situated inside this cone.

For reasons of simplification of FIG. 1, the entry axis 106 and the exit axis 110 are shown merged.

FIG. 2 shows an image 200 captured by the capture means 104 in the case of a real eye and FIG. 3 shows an image 300 captured by the capture means 104 in the case of a false eye.

In the case of a real eye, the image 200 has a peripheral zone 202 representing the iris 54 and a central zone 204 representing the macula 53 in the peripheral zone 202. The colour of the peripheral zone 202 is different from the colour of the central zone 204. In the case of a black and white image, the peripheral zone 202 is black overall while the central zone 204 is grey overall.

In the case of the false eye, the image 300 has a single zone 302 since the false eye does not have a macula 53 that can reflect the infrared light. The single zone 302 then has a black colour overall.

The decision device 100 also comprises processing means 108 that receive each image 200, 300 captured by the capture means 104. The processing means 108 are provided for analysing an image 200, 300 thus captured and for detecting, on a captured image 200, 300, whether a peripheral zone 202 representing the iris 54 exists and whether a central zone 204 in the peripheral zone 202, the colour of which represents the existence of the macula 53, exists, and for delivering information representing this detection.

The decision device 100 also comprises decision means 109 provided for deciding whether the eye 50 is real or false according to the information delivered by the processing means 108.

Such detection may be made by any software making it possible to detect specific shapes and specific colours in an eye image (grey or white zone instead of a black zone on a false one).

The decision device 100 thus makes it possible to decide whether the eye 50 present is real or false.

Naturally the colour of the central zone 204 and the colour of the peripheral zone 202 or of the single zone 302 are dependent on the characteristics of the capture means 104. In particular, the decision device 100 is calibrated so that the "grey" colour of the central zone 204 corresponds to a red colour of the macula 53. In a particular embodiment, a central zone 204 the LSB value of the colour of which is greater than 128 (grey to white) is coloured to represent the presence of a macula 53 and therefore of a real eye 50.

The decision device 100 may be used in the case of an eye 50 that is immobile and placed so that its optical axis 51 is aligned with the entry axis 106 and so that its macula 53 is thus illuminated by the lighting means 102.

However, preferentially, the decision device 100 is used to make a decision on the fly.

To this end, the decision device 100 comprises tracking means 150 and positioning means 160 controlled by the tracking means 150.

The tracking means 150 are provided for tracking the face of the individual passing in front of the decision device 100, more particularly in front of the lighting means 102 and the capture means 104, in order to locate at least one eye 50 on this face and to determine the direction of the optical axis 51 of this eye 50.

Such tracking means 150 comprise here a tracking camera 152 and a computing unit 154. The tracking camera 152 captures the images of the face and the computing unit 154 determines the direction of the optical axis 51 of the eye 50 from the analysis of these images.

Such tracking means 150 are known to persons skilled in the art and are for example described in the document entitled "Modeling, reconstruction and tracking for face recognition, chapter in Signal and image processing for biometrics" by C. Herold, V. Despiegel, S. Gentric, S. Dubuisson, I. Bloch (A. Nait-Ali Ed.), pp. 57-88, (ISTE-Wiley), 2012.

The positioning means 160 are provided for aligning the entry axis 106 and the exit axis 110 with the optical axis 51.

The lighting means 102 have an emission direction 162 and the capture means 104 has a reception direction 164.

In the embodiment of the invention presented in FIG. 1, the emission direction 162 and the reception direction 164 are oriented substantially vertically.

For an individual walking towards the decision device 100, the optical axis 51 is oriented substantially horizontally. In order to redirect the infrared flux emitted along the emission direction 162 on the entry axis 106, the positioning means 160 comprise a base 168 on which a 45° mirror 166 is mounted disposed vertically above the lighting means 102 and the capture means 104. The positioning of the mirror 166 also makes it possible to redirect the image of the macula 53 that is emitted along the exit axis 110 in the reception direction 164.

The positioning means 160 also comprise a linear movement means 170 provided for linearly moving the base 168 parallel to the emission direction 162 (double arrow 163). The computing unit 154 controls the linear movement means 170 according to the direction of the optical axis 51 that it has determined in order to align the optical axis 51, the entry axis 106 and the exit axis 110.

The linear movement means 170 takes for example the form of a linear motor that moves the base 168.

Thus, according to the height of the eye 50 recorded by the tracking means 150, the linear movement means 170 position the mirror 166 at this height.

The decision device 100 is preferably coupled to or integrated in an identification device which, after capture of an image of the iris 54 of the eye 50, compares this image with reference iris images if the decision device 100 has decided that the eye 50 is real.

According to a first embodiment, supplementary infrared lighting means and an infrared capture means at the iris 54 are added.

According to a second embodiment, the decision device 100 comprises offsetting means 180 controlled by the tracking means 150 and provided for offsetting the entry axis 106 and therefore the infrared flux emitted along the entry axis 106, towards the iris 54 rather than towards the macula 53. In other words, the offsetting means 180 are provided for disaligning the entry axis 106 and the exit axis 110 with respect to the optical axis 51, in particular outside the 5° cone around the optical axis 51, so that, even if the macula 53 remains partially illuminated by an infrared flux issuing from the lighting means 102, it is no longer seen by the capture means 104.

To allow capture of an image of the iris 54 that can be identified by comparison with the reference iris images, an infrared flux illuminates the iris 54. That is to say so as to move the entry axis 106 out of the 5° cone.

In the case of a real eye 50, the image captured by the capture means 104 is then similar to the image 300 in FIG. 3, that is to say there is no longer a "grey" central zone 204 because the infrared flux that could be reflected on the macula 53 is no longer seen by the capture means 104.

The offsetting of the entry axis 106 in the same way causes the offsetting of the exit axis 110, which is followed by the infrared flux reflected by the iris 54.

In the embodiment of the invention depicted in FIG. 1, the mirror 166 is mounted on the base 168 by means of an angular movement means 182 such as for example a rotary motor the shaft of which carries the base 168 and is here perpendicular to the plane containing the entry axis 106 and the emission direction 162 (double arrow 183). The angular movement means 182 constitutes the offsetting means 180.

The computing unit 154 controls the angular movement means 182 in order to offset the entry axis 106.

When the offsetting means 180 have offset the entry axis 106, the capture means 104 captures an image of the iris 54, which the processing means 108 can process in a conventional manner and compare with reference iris images if the eye 50 has indeed been detected as a real eye.

To enable a plurality of images to be captured by the capture means 104, both of the illuminated macula 53 and of the illuminated iris 54, the computing unit 154 controls the movement of the offsetting means 180 in alternation and successively.

The movement of the entry axis 106 and the capture of an image further allows a double decision because the eye 50 is a real eye or a false eye. This is because this movement and capture make it possible to verify that the eye 50 is not a false eye on which a red spot representing a macula 53 has been painted.

This is because, with such a false eye 50, the lighting in line with the optical axis 51 generates a "grey" central zone 24 imitating the presence of a macula 53, but lighting outside the alignment of the optical axis 51 also generates a "grey" central zone 204 because the red spot is also at least partly illuminated by the infrared flux and reflects this infrared flux.

The software for detecting the colours previously described may be used.

To avoid damage to the eye 50 under the effect of the infrared flux, the latter is pulsed.

According to a particular embodiment, the images are captured in a range from 80 cm to 2 m distant from the decision device 100.

According to another embodiment of the invention, the lighting means 102 and the capture means 104 may be disposed on the base 168 in place of the mirror 166 and oriented so as to present the emission direction 162 and the reception direction 164 both oriented horizontally towards the individual and thus merge respectively with the entry axis 106 and the exit axis 110. The linear movement means 170 and the angular movement means 182 then act directly on the lighting means 102 and the capture means 104.

FIG. 4 shows a flow diagram of a decision method 400 according to a first embodiment of the invention and which comprises:
  an alignment step 402 during which the entry axis 106 and the exit axis 110 are aligned with the optical axis 51 so that illumination of the macula 53 under the incidence of the entry axis 106 is seen by the capture means 104, a lighting step 404 during which the lighting means 102 illuminate the eye 50 along the entry axis 106, a capture step 406 during which the capture means 104 captures an image 200, 300 of the zone of the eye 50 thus illuminated, a processing step 408 during which the processing means 108 detect on an image 200, 300 whether a peripheral zone 202 representing the eyes 54 exists and whether a central zone 204 inside the peripheral zone 202, the colour of which represents the existence of the macula 53, exists, and deliver information representing this detection, and a decision step 410 during which the decision means 109 decide whether the eye 50 is real or false according to the information delivered by the processing means 108.

In the case of an immobile eye 50, the alignment step 402 is implemented by positioning the eye 50 and maintaining it in position in front of the decision device 100.

In the case of a decision on the fly, the alignment step 402 consists, for the tracking means 150, of a step of tracking the face, a step of locating an eye 50 on this face thus tracked, and a step of determining the direction of the optical axis 51 of this eye 50, and tracking for the positioning means 160 by a positioning step during which the positioning means 160 align the entry axis 106 and the exit axis 110 with the optical axis 51.

The alignment step 402 consists of aligning the entry axis 106 and the exit axis 110 with the optical axis 51, that is to say inside the 5° cone around the optical axis 51.

The processing step 408 delivers positive information if the presence of a peripheral zone 202 representing the iris 54 and the presence of a central zone 204 with a colour appropriate to that expected in the case of the existence of a macula 53 are detected on the captured image 200. The processing step 408 delivers negative information if the presence of the peripheral zone 202 representing the iris 54 or the presence of a central zone 204 with a colour appropriate to that expected in the case of the existence of a macula 53 is not detected on the captured image 300.

FIG. 5 shows a flow diagram of a decision method 500 according to a second embodiment of the invention, which corresponds to the case where the decision device 100 comprises offsetting means 180 and a double decision is taken.

The decision method 500 comprises:

a tracking step 520 during which the tracking means 150 track a face of individual passing in front of the decision device 100, more particularly the lighting means 102 and the capture means 104 locate an eye 50 on this face and determine the direction of the optical axis 51 of this eye 50, an alignment step 402 during which the positioning means 160 align the entry axis 106 and the exit axis 110 with the optical axis 51 so that an illumination of the macula 53 by the lighting means 102 under the incidence of the entry axis 106 is seen by the capture means 104, that is to say the entry axis 106 and the exit axis 110 are in the 5° cone around the optical axis 51, a first lighting step 404 during which the lighting means 102 illuminate the eye 50, a first capture step 406 during which the capture means 104 captures an image 200, 300 of the zone of the eye 50 thus illuminated, a first processing step 408 during which the processing means 108 analyse an image 200, 300 thus captured in order to detect whether a peripheral zone 202 representing the iris 54 exists and whether a central zone 204 inside the peripheral zone 202, the colour of which represents the existence of the macula 53, exists, and deliver a first item of information representing such detection, a disalignment step 502 during which the offsetting means 108 offset the entry axis 106 and the exit axis 110 from the optical axis 51 so that, even if the macula 53 remains partially illuminated by an infrared flux issuing from the lighting means 102, it is no longer seen by the capture means 104, that is to say the entry axis 106 and the exit axis 110 are not in the 5° around the optical axis 51, a second lighting step 504 during which the lighting means 102 illuminate the eye 50 along the entry axis 106, a second capture step 506 during which the capture means 104 captures an image of the zone of the eye 50 thus illuminated, a second processing step 508 during which the processing means 108 analyse an image thus captured in order to detect whether a peripheral zone 202 representing the iris 54 exists and whether a central zone 204 inside the peripheral zone 202, the colour of which represents the existence of the macula 53, exists, and deliver a second item of information representing this decision, and a decision step 510 during which the decision means 109 decide whether the eye 50 is real or false according to the first item of information and the second item of information delivered by the processing means 108.

The presence of a real eye 50 is validated if, firstly, the first processing step 408 delivers a first positive item of information and if, secondly, the second processing step 508 delivers a second negative item of information, and is invalidated if the first processing step 408 delivers first negative item of information or the second processing step 508 delivers a second positive item of information.

Each processing step 408, 508 delivers positive information if the presence of a peripheral zone 202 representing the iris 54 and the presence of a central zone 204 with a colour appropriate to that expected in the case of the existence of a macula 53 are detected on the captured image 200.

Each processing step 408, 508 delivers negative information if the presence of a peripheral zone 202 representing the iris 54 or the presence of a central zone 204 with a colour appropriate to that expected in the case of the existence of a macula 53 is not detected on the captured image 300.

Naturally the present invention is not limited to the examples and embodiments described and depicted but is capable of numerous variants accessible to a person skilled in the art.

The invention claimed is:

1. A decision device provided for deciding whether an eye having a macula and an optical axis is real or false, said decision device comprising:

a light emitting an infrared flux towards the eye along an entry axis;

an infrared camera capturing an image of the eye along an exit axis, the entry axis and the exit axis being aligned with the optical axis so that the macula illuminated by the light under the incidence of the entry axis is seen by the camera;

processor detecting, on an image captured by the camera, whether a peripheral zone representing the iris exists and whether a central zone in the peripheral zone, a colour of which is representative of the existence of the macula, exists, and delivering information representing this detection;

a decider deciding whether the eye is real or false according to the information delivered by the processor;

a tracker tracking a face of an individual passing in front of the light and the camera, in order to locate an eye on this face and to determine the direction of the optical axis of this eye;

a positioner controlled by the tracker and aligning the entry axis, the exit axis and the optical axis;

a displacer controlled by the tracker and offsetting the entry axis and the exit axis with respect to the optical axis so that, even if the macula remains partly illuminated by the light, it is no longer seen by the camera, wherein the light has an emission direction, the camera has a reception direction, the emission direction and the reception direction are vertical, the optical axis is horizontal, the positioner comprises firstly a base on which a 45° mirror is mounted, disposed vertically above the light and the camera, and secondly a linear displacer provided for linearly moving the base parallel to the emission direction, and the displacer comprises an angular displacer mounted on the base and carrying the mirror.

2. A decision method for deciding whether an eye having a macula and an optical axis is real or false and implemented by a decision device comprising a light emitting an infrared flux along an entry axis, an infrared camera capturing an image on an exit axis, a processor, a decider, a tracker, positioner, a displacer controlled by the tracker, said decision method comprising:

locating an eye on this face tracked by the tracker;

determining a direction of the optical axis of this eye;

aligning, by the positioner, the entry axis and the exit axis with the optical axis so that illumination of the macula by the light under the incidence of the entry axis is seen by the camera;

illumination the eye with the light;

capturing an image of the zone of the eye thus illuminated with the camera;

detecting, by the processor, on an image thus captured whether a peripheral zone representative of the iris exists and whether a central zone in the peripheral zone, the colour of which is representative of the existence of the macula, exists, and delivering a first item of information representing this detection, offsetting, by the displacer, the entry axis and the exit axis from the optical axis so that, even if the macula remains partly illuminated by the light, it is no longer seen by the camera;

illuminating the eye with the light;

capturing an image of the zone of the eye thus illuminated with the camera;

detecting, by the processor, on an image thus captured, whether a peripheral zone representative of the iris exists and whether a central zone in the peripheral zone, the colour of which is representative of the existence of the macula, exists, and delivering a second item of information representing this detection; and deciding, by the decider, whether the eye is real or false according to the first item and second item of information delivered by the processor.

* * * * *